United States Patent
Boloorian et al.

(10) Patent No.: US 9,820,236 B2
(45) Date of Patent: Nov. 14, 2017

(54) POWER COMPENSATION IN MULTI-CARRIER TRANSMITTERS

(71) Applicant: Intel IP Corporation

(72) Inventors: Majid Boloorian, Allentown, PA (US); Sanjeev Tavathia, Breinigsville, PA (US); Tobias Scholand, Duisburg (DE)

(73) Assignee: Intel IP Corporation, Santa Clara, CA (US)

( * ) Notice: Subject to any disclaimer, the term of this patent is extended or adjusted under 35 U.S.C. 154(b) by 207 days.

(21) Appl. No.: 14/671,183

(22) Filed: Mar. 27, 2015

(65) Prior Publication Data

US 2016/0286496 A1 Sep. 29, 2016

(51) Int. Cl.
*H04W 52/14* (2009.01)
*H04W 52/36* (2009.01)
*H04W 52/34* (2009.01)

(52) U.S. Cl.
CPC ....... *H04W 52/146* (2013.01); *H04W 52/346* (2013.01); *H04W 52/367* (2013.01); *H04W 52/362* (2013.01)

(58) Field of Classification Search
CPC ............. H04W 52/146; H04W 52/367; H04W 52/346; H04W 52/362
See application file for complete search history.

(56) References Cited

U.S. PATENT DOCUMENTS

| | | | | |
|---|---|---|---|---|
| 2005/0054382 A1* | 3/2005 | Boettcher | ................. | H03F 1/02 455/561 |
| 2010/0061480 A1* | 3/2010 | Kashiwase | ............ | H04W 52/04 375/295 |
| 2012/0178494 A1* | 7/2012 | Haim | .................. | H04W 52/365 455/522 |
| 2013/0100880 A1* | 4/2013 | Moren | ................ | H04W 52/367 370/328 |
| 2014/0113675 A1* | 4/2014 | Scholand | .............. | H04W 52/16 455/522 |
| 2016/0360493 A1* | 12/2016 | Chande | ............... | H04W 52/245 |

FOREIGN PATENT DOCUMENTS

TW 201242396 A 10/2012

OTHER PUBLICATIONS

European Search Report dated Aug. 5, 2016 for European Patent Application 16158150.9.
Office Action dated Dec. 16, 2016 for Taiwan Patenrt Application No. 105105507 (with English translation).

* cited by examiner

*Primary Examiner* — Luat Phung
(74) *Attorney, Agent, or Firm* — Schiff Hardin LLP

(57) ABSTRACT

A transmitter and method for transmitting a communication signal having at least a first carrier and a second carrier. The transmitter includes a scaling factor estimator configured to estimate a first power scaling factor for the first carrier and a second power scaling factor for the second carrier; and a gain controller configured to adjust at least one of a power of the first carrier based on the first power scaling factor and a power of the second carrier based on the second power scaling factor, wherein a sum of the adjusted powers of the first and second carriers is less than or equal to a maximum transmission power, and a power imbalance between the adjusted powers of the first and second carriers is less than or equal to a maximum power imbalance.

25 Claims, 6 Drawing Sheets

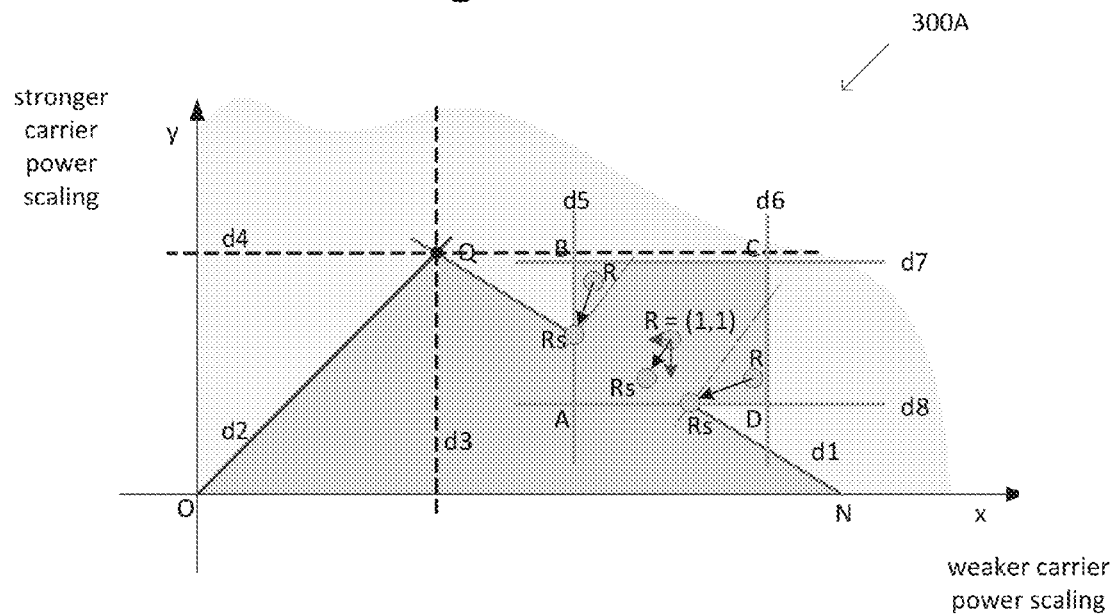
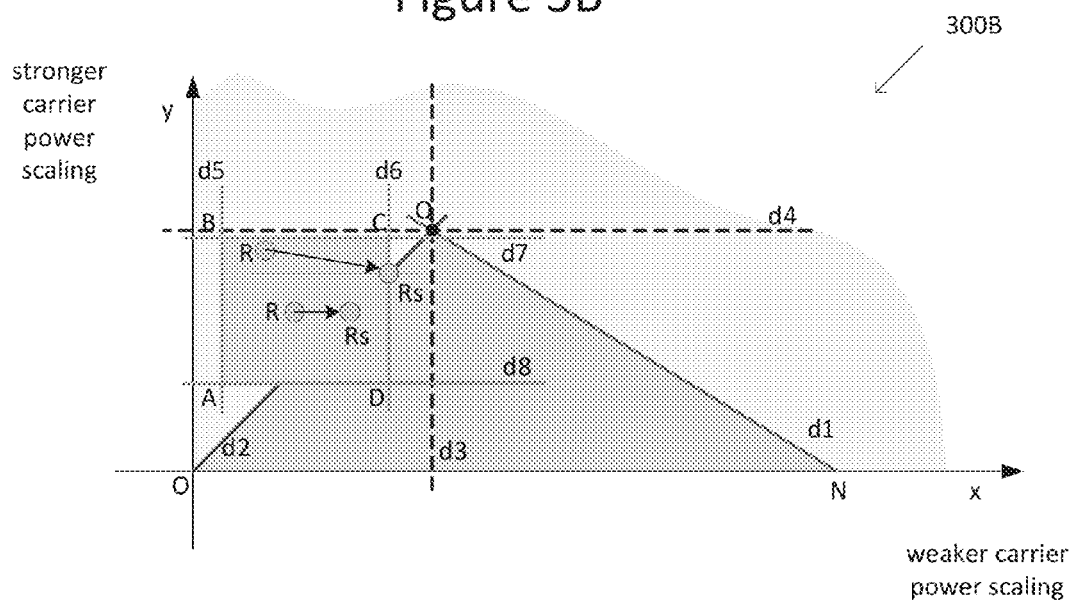

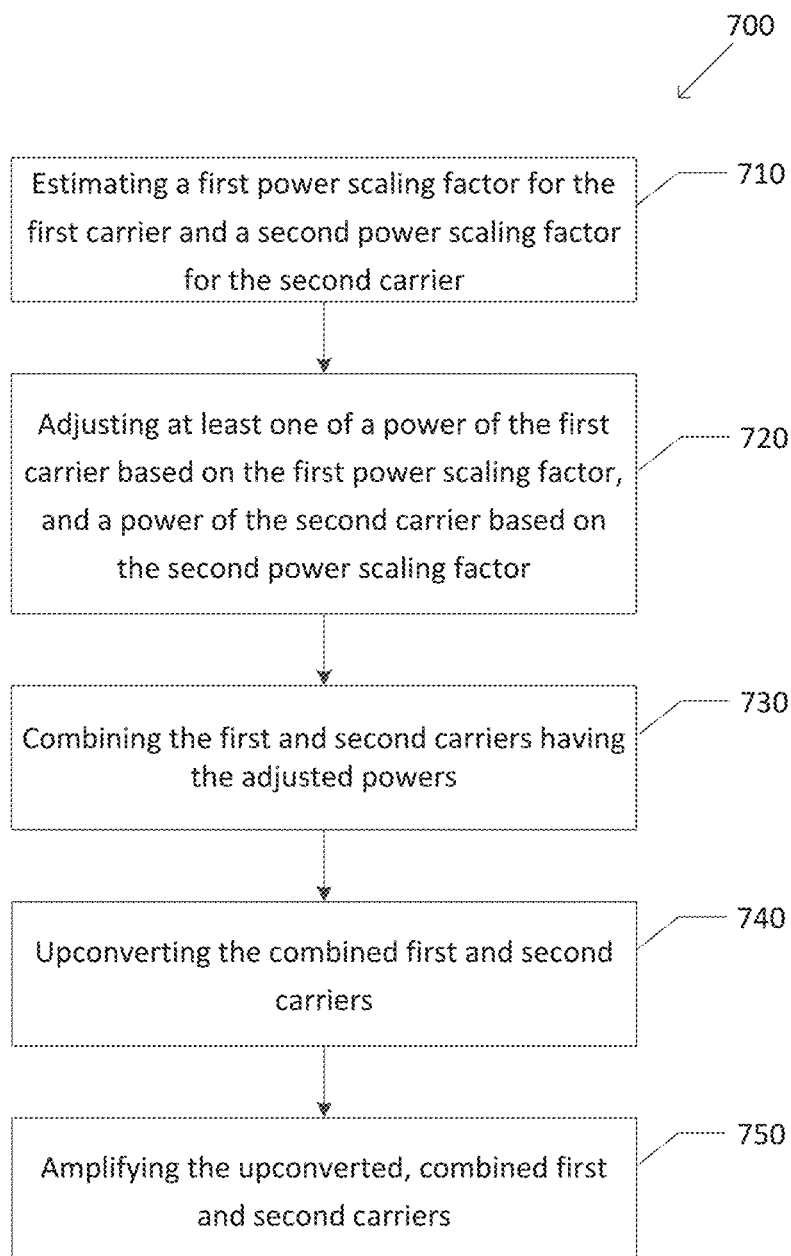

POWER COMPENSATION IN MULTI-CARRIER TRANSMITTERS

TECHNICAL FIELD

The present disclosure generally relates to power compensation in multicarrier transmitters, and more specifically, to compensation of carrier power imbalance and total carrier power in multicarrier transmitters.

BACKGROUND

In multicarrier transmitters, such as those based on the 3rd Generation Partnership Project's (3GPP's) dual carrier Enhanced Dedicated Channel (E-DCH) standard, also known as the Dual Carrier High Speed Uplink Packet Access (DC-HSUPA) standard, if a sum of powers of multiple carriers is input into a single power amplifier, the radio frequency circuitry should be designed to tolerate a specific range of carrier power imbalance. A design capable of handling a wide range of carrier power imbalance between the multiple carriers is impractical and expensive. On the other hand, a design which accommodates only a moderate range of carrier power imbalance can result in undesired in-band interference, which degrades signal transmission quality.

BRIEF DESCRIPTION OF THE DRAWINGS

FIG. 3A illustrates a graph of the stronger carrier power scaling versus the weaker carrier power scaling to depict three examples based on a maximum total power requirement.

FIG. 3B illustrates a graph of the stronger carrier power scaling versus the weaker carrier power scaling to depict two examples based on a maximum power imbalance requirement.

FIG. 7 illustrates a flowchart of a method for transmitting a communication signal.

DESCRIPTION OF THE ASPECTS

The present disclosure is directed to multicarrier transmission compensation, applied at the physical layer, for maintaining carrier power imbalance and total carrier power within acceptable ranges simultaneously without sacrificing transmitter and system performance.

Figure 1:
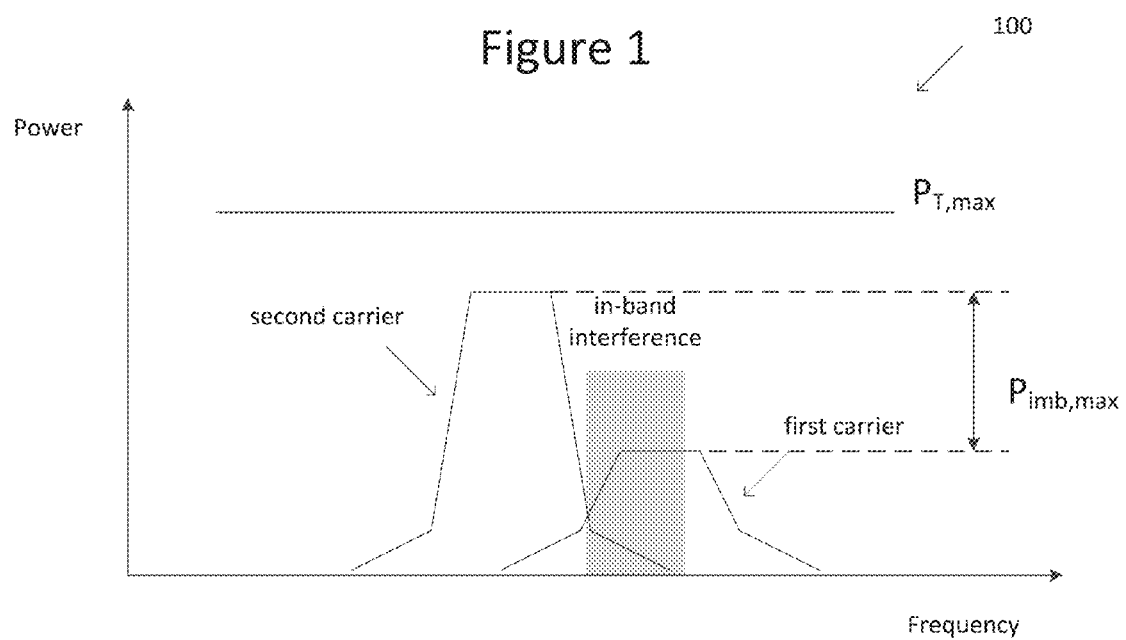
FIG. 1 illustrates a graph of power versus frequency for first and second carriers.

FIG. 1 illustrates a graph 100 of power versus frequency for first and second carriers in multicarrier transmission. The graphs are for illustration purposes and are not meant to be mathematically accurate.

A "carrier" is a frequency at which information is transmitted. Information is normally generated at baseband, which is at a low frequency and cannot be used for transmission. The center frequency of the baseband signal is thus increased to a higher frequency for transmission. This higher frequency is referred to as the carrier. In multicarrier transmission, one set of baseband information is increased to a first carrier, and another set of baseband information is increased to a second carrier, etc., as shown in FIG. 1 for the two carrier case. The two sets of information on the first and second carriers, respectively, can be transmitted in parallel. The disclosure is not limited to multicarrier transmission with two carriers, but may include any number of carriers suitable for the intended purpose.

DC-HSUPA, for example, combines these first and second carriers into a larger data transmission with joint scheduling of uplink traffic across the two carriers. DC-HSUPA allows mobile devices to make use of instantaneous capacity available on either carrier. The benefit is a significant increase in the amount of transmitted data which leads to higher system capacity.

Ideally, transmissions on a carrier are limited to a given range of frequencies causing no interference on adjacent bands/carriers. In reality however, there is always interference into adjacent bands or carriers, as shown by the shaded boxes in FIG. 1. The "in-band interference" shown in the figures is the interference impacting an adjacent carrier of the same transmitter, as opposed to "out-of-band interference," which is the interference impacting an adjacent carrier of a different transmitter.

FIG. 1A illustrates a case where the power of the second carrier is similar to the power of the first carrier. In this case the interference is not significant and may be ignored. FIG. 1B, on the other hand, illustrates a case where the power of the first carrier is low relative to that of the second carrier. In this case, the level of interference from the stronger carrier on the weaker carrier is significant.

As will be described in more detail below, the disclosure is directed to adjusting carrier power in multicarrier transmitters by using the following two parameters: (1) maximum power imbalance; and (2) maximum total transmission power.

The maximum tolerable power imbalance $P_{imb,max}$ is the ratio of the power of the stronger carrier to that of the weaker carrier and is based on a maximum level of in-band interference that may be tolerated. This value is determined by design.

The maximum carrier power $P_{T,max}$ is the maximum total power available for signal transmission and is determined by the transmitter power capabilities. This value is represented in FIG. 1 by the upper, horizontal line. A "grant" relates to the maximum available power for data transmission on a given carrier at a given time. In DC-HSUPA, for example, serving grants of the first and the second carriers and the first carrier's non-scheduled grants are used by the MAC layer to determine the upper limits of the powers available for transmission. When the amount of available information on a carrier is less than that indicated by the corresponding power upper limit, part of the available power on that carrier remains unused. The power budget which is not used by the MAC layer can be leveraged to reduce the power imbalance by means of an algorithm applied at the physical layer.

Figure 2:
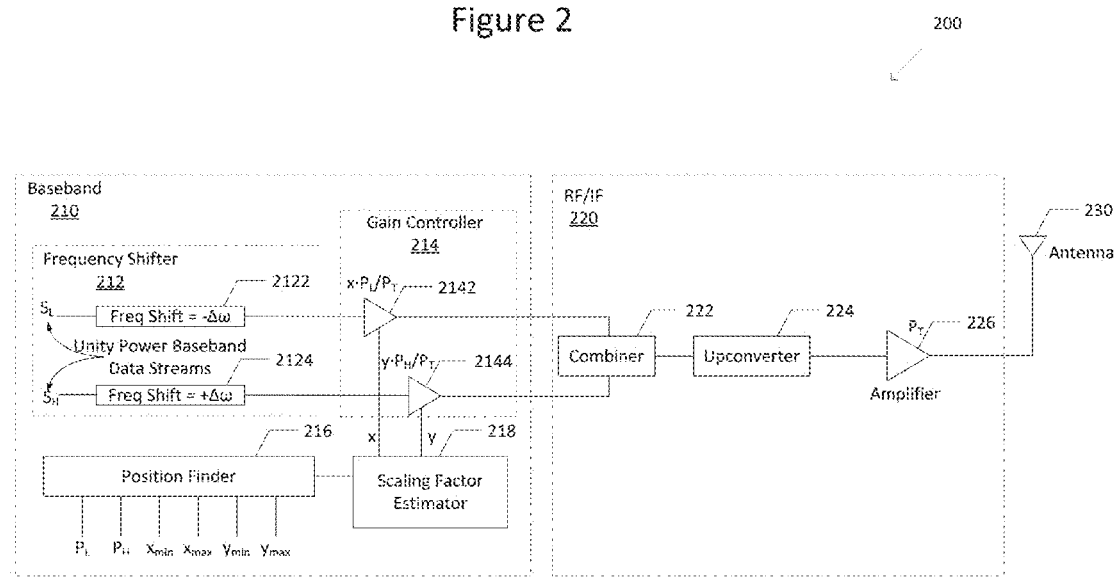
FIG. 2 illustrates a schematic diagram of a transmitter for transmitting a communication signal.

FIG. 2 illustrates a schematic diagram of a transmitter 200 for transmitting a communication signal having at least a first carrier and a second carrier. The transmitter may be designed based on the 3GPP DC-HSUPA standard, but the disclosure is not limited in this respect. The transmitter 200 may be designed based on any multicarrier standard.

The transmitter 200 includes a baseband 210, a radio frequency (RF)/intermediate frequency (IF) 220, and an antenna 230.

The baseband 210 includes a frequency shifter 212, a gain controller 214, a position finder 216, and a scaling factor estimator 218. By way of overview, the frequency shifter 212 is configured to shift two baseband data streams $S_L$, $S_H$ from baseband to higher frequencies, the position finder 216 is configured to determine the position of a point on a power adjustment graph corresponding to uncompensated carrier powers and relative to limits corresponding to the maximum and minimum powers available to each carrier on a graph based on power modifications and relative to the maximum and minimum powers available, the scaling factor estimator 218 is configured to estimate power scaling factors x, y of the first and second carriers, and the gain controller 214 is configured to adjust the powers of the frequency-shifted first and second carriers in accordance with the power scaling factors x, y. More detailed explanations follow.

The frequency shifter 212 includes a first frequency shifter 2122 and a second frequency shifter 2124. The first frequency shifter 2122 is configured to receive as input the baseband signal $S_L$ and shift this signal by a frequency amount $-\Delta\omega$. The second frequency shifter 2124 is configured to receive as input the baseband signal $S_H$ and shift this signal by a frequency amount $+\Delta\omega$. The baseband signals $S_L$ and $S_H$ are thus shifted on either side of the DC (0 frequency) by a distance $\Delta\omega$. Baseband signals $S_L$ and $S_H$ comprise information to be transmitted, and this information could be voice, video, data, etc.

The position finder 216 is configured to determine the position of a point on a power adjustment graph corresponding to uncompensated carrier powers and relative to limits corresponding to the maximum and minimum powers available to each carrier as will be described with respect to FIGS. 3A, 3B, 4A, 4B, and 5 below. In these figures the x and y axes are the power scaling factors not the actual powers. The position finder 216 is configured to receive as input a power of a weaker carrier $P_L$, a power of a stronger carrier power $P_H$, a minimum scaling of the weaker carrier power $x_{min}$, a maximum scaling of the weaker carrier power $x_{max}$, a minimum scaling of a stronger carrier power $y_{min}$, and a maximum scaling of the stronger carrier power $y_{max}$. In the case of DC-HSUPA, $x_{min}$, $x_{max}$, $y_{min}$, and $y_{max}$ are set by the higher layers. The power of the weaker carrier $P_L$ and the power of the stronger carrier power $P_H$ are the powers of the first and second signals, respectively, and are determined on the fly.

The scaling factor estimator 218, which is located in the physical layer, is configured to estimate the power scaling factors to avoid exceeding the maximum transmitter power $P_{T,max}$ and the maximum power imbalance $P_{imb,max}$ in accordance with the following equations:

$y \leq x \cdot P_L/P_H + P_{T,max}$ (Equation 1a—total carrier power requirement)

Total Carrier Power = $x \cdot P_L + y \cdot P_H$ (Equation 1b)

$y \leq x \cdot P_{imb,max} \cdot P_L/P_H$,
and (Equation 2a—carrier power imbalance requirement)

Carrier Power Imbalance = $y \cdot P_H / x \cdot P_L$ (Equation 2b)

where $P_L$ is the power of the first or second carrier having a lower power, and $P_H$ is the power of the first or second carrier having a higher power, $P_{T,max}$ is the maximum transmission power, $P_{imb,max}$ is the maximum power imbalance, x is the scaling applied to the weaker carrier, and y is the scaling applied to the stronger carrier.

Equation 1a is used to ensure that the total power, that is the sum of the scaled powers of the two carriers ($x \cdot P_L + y \cdot P_H$), is not higher than the maximum transmission power $P_{T,max}$. Initially, before data transmission, the information used to determine the values for $P_L$ and $P_H$ may not be accurate. As transmission time becomes closer, it is determined whether the sum of the powers of the two carriers exceeds the maximum allowed transmission power $P_{T,max}$. If the sum does not exceed the maximum allowed transmission power $P_{T,max}$, the scaling factors (x and y) of the two carrier powers ($P_L$ and $P_H$) remain equal to 1. On the other hand, if the sum does exceed the maximum allowed transmission power $P_{T,max}$, the scaling factors x and y are used to scale down the carrier powers, x for $P_L$ and y for $P_H$, in order to reduce the total carrier power to $xP_L + yP_H$.

Equation 2a is used to ensure that the power imbalance, that is, the balance between the scaled powers of the two carriers, does not exceed maximum tolerable carrier imbalance $P_{imb,max}$.

Initially, before application of power scaling, the value of x is equal to 1 and is within the range of $x_{min}$ to $x_{max}$, and similarly, the value of y is equal to 1 and is within the range of $y_{min}$ to $y_{max}$. $x_{min}$ and $y_{min}$. These values are set by layers higher. As is known, there are different layers of transmission control. The first layer is the physical layer, which represents the hardware. They layers above the physical layer include the MAC layer, which is a control layer, and a network layer, which communicates with the network to transmit information to the lower layers (MAC and physical). $y_{max}$ and $y_{max}$ are determined by the grants. A grant is a maximum power transmission on each carrier. In DC-HSUPA, for example, a grant is received from the network.

The gain controller 214, which is also located in the physical layer, includes a first gain/attenuation stage 2142 and a second gain/attenuation stage 2144. The first stage 2142 is configured to amplify/attenuate the weaker carrier, that is, the frequency shifted baseband signal $S_L$, by $x \cdot P_L/P_T$. The second stage 2144 is configured to amplify/attenuate the stronger carrier, that is, the frequency shifted baseband signal $S_H$, by $y \cdot P_L/P_T$. x is the scaling applied to the weaker carrier, y is the scaling applied to the stronger carrier, $P_L$ is the power of the weaker carrier, $P_H$ is the power of the stronger carrier power, and $P_T$ is the total power of the weaker and stronger carriers.

The carrier power adjustments occur prior to transmission of the communication signal. These adjustments may occur as needed; every slot in the case of DC-HSUPA, though the disclosure is not limited in this respect. These adjustments may occur periodically or aperiodically. Transmission and reception is divided into units of time, which is a frame. In the case of DC-HSUPA, a frame is 10 msec. A frame is subdivided into slots, and for DC-HSUPA, there are 15 slots within one frame. These calculations are done, for the DC-HSUPA example, from slot-to-slot.

The RF/IR 220 includes a combiner 222, an upconverter 224, and an amplifier 226. These components are known. The combiner 222 is configured to combine the first and second carriers having the adjusted powers. The upconverter 224 is configured to upconvert the combined first and second carriers to a higher frequency. The amplifier 226 is configured to amplify the upconverted, combined first and second carriers before the communication signal comprising the first and second upconverted carriers is transmitted by the antenna 230.

FIGS. 3A, 3B, 4A, 4B, and 5 illustrate graphs of the stronger carrier power scaling (y axis) versus the weaker carrier power scaling (x axis) for explaining in a visual manner the solutions to Equations 1a and 2a described above, which determine the scaling factors for modifying the carrier powers.

In the figures, line d1 determines the requirement for power scaling. Line d2 determines the requirement for power scaling. Line d5 represents the minimum scaling $x_{min}$ for the weaker carrier power, and line d6 represents the maximum scaling $x_{max}$ for the weaker carrier power. Line d8 represents the minimum scaling $y_{min}$ for the stronger carrier power, and line d7 represents the maximum scaling $y_{max}$ for the stronger carrier power. The point R=1,1 represents the initial values of the carrier powers prior to scaling that is, when x=1 and y=1. In E-DPDCH, for example, lines d5 and d8 are set by the higher layers, and lines d6 and d7 are calculated by the MAC layer according to grants.

The position of point R relative to line d1 indicates whether carrier power scaling is required. If point R is located to the right of line d1, the maximum allowable transmit power $P_{T,max}$ is exceeded indicating requirement for power scaling. Line d1 is represented by the following equation:

$$\text{Line } d1: y = x \cdot P_L/P_H + P_{T,max}. \quad \text{(Equation 1c)}$$

The position of point R relative to line d2 indicates whether carrier power balancing is required. If point R is located to the left of line d2, then the maximum tolerable power imbalance $P_{imb,max}$ is exceeded indicating requirement for power balancing. The quality of the transmitter 100's signal is degraded, but not that of the neighboring out-of-band signal. Line d2 is represented by the following equation:

$$\text{Line } d2: y = x \cdot P_{imb,max} \cdot P_L/P_H. \quad \text{(Equation 2c)}$$

The point R is always located inside the rectangle defined by lines d5, d6, d7, and d8 ("d5-d6-d7-d8 rectangle"). In order for Equation 1a (maximum carrier power requirement) and Equation 2a (carrier power imbalance requirement) to be satisfied, the point R should be located within the triangle defined by lines d1 and d2 ("d1-d2 triangle") and the x-axis, that is, within the maximum total power $P_{T,max}$ and within the maximum power imbalance $P_{imb,max}$ boundaries. If the point R is located outside of this d1-d2 triangle, one or more carrier powers are compensated to move the point R to be located either within the d1-d2 triangle or at least on its boundaries. This compensation solves two problems. First, the carrier powers are scaled, that is the point R is moved, so that the sum of carrier powers do not exceed the maximum total power $P_{T,max}$. At the same time the scaling values x, y may be adjusted in different directions, that is, to increase one carrier power and/or decrease another carrier power, so that the maximum power imbalance $P_{imb,max}$ is not exceeded.

Levels of compensation to the carrier powers depend on the relative positions of the d1-d2 triangle and the d5-d6-d7-d8 rectangle, and also on the initial position of point R relative to these two areas. If the d1-d2 triangle and the d5-d6-d7-d8 rectangle overlap, and point R is located within the overlap, no power modification is necessary. If the d1-d2 triangle and the d5-d6-d7-d8 rectangle overlap, but point R is not located within the overlap, point R is moved to a point on line d1 or on line d2. If the d1-d2 triangle and the d5-d6-d7-d8 rectangle do not overlap, point R is moved to a new position on a boundary of the d5-d6-d7-d8 rectangle in the direction of the d1-d2 triangle.

There are two criteria that may be considered when moving point R to be located within or on the d1-d2 triangle. One criterion is a minimum distance between the initial and the new positions of R resulting in the smallest modifications of the carrier powers. In this case, there is a minimum amount of change applied. To avoid degradation of the received signal quality, the attenuation of the carrier powers should be kept at a minimum.

An alternative criterion, which is similar to that used by the 3GPP's scaling procedure, is that depending on the position of point R relative to line d1 or line d2, whichever is the closest, the point R is moved first parallel to one axis in the direction of the nearest line d1 or d2, and if necessary, parallel to the other axis in order to move point R onto, or as near as possible to, line d1 or line d2. Unlike the procedure outlined in the 3GPP specifications, this modification may be performed in one step as opposed to two. If there is no area of overlap between the d1-d2 triangle and the d5-d6-d7-d8 rectangle, the shortest distance between point R and line d1 or line d2 may be used as the deciding factor when selecting the new position of point R.

More specific examples with respect to FIGS. 3A, 3B, 4A, 4B, and 5 will now be described.

FIG. 3A illustrates a graph of the stronger carrier power scaling (y axis) versus the weaker carrier power scaling (x axis) to depict three examples (three points labeled "R") in which the carrier powers are scaled to meet the maximum total power $P_{T,max}$ requirement (Equation 1a; line d1). Each of these three examples involve cases where point R is initially located to the right of line d1, and the lower left corner of the d5-d6-d7-d8 rectangle (point A) is located within the d1-d2 triangle. There is no carrier power imbalance issue as each point R is located to the right of line d2. In these examples both the weaker carrier power $P_L$ and the stronger carrier power $P_H$ are compensated to be lower using the scaling factors x, y to move the point R to point $R_s$ (scaled point R) to be located on line d1 and thus meet the maximum total power $P_{T,max}$ requirement.

FIG. 3B illustrates a graph of the stronger carrier power scaling (y axis) versus the weaker carrier power scaling (x axis) to depict two examples (two points labeled "R") in which the carrier powers are scaled to meet the maximum power imbalance $P_{imb,max}$ requirement (Equation 2a; line d2). Each of these two examples involve cases where point R is located to the left of line d2, and the lower right corner of d5-d6-d7-d8 rectangle (point D) is located within d1-d2 triangle. There is not a maximum total power $P_{T,max}$ issue as each point R is located to the left of line d1. In the example illustrated by the point R located higher on the y axis, the stronger carrier power $P_H$ is reduced, while the weaker carrier power $P_L$ is increased to move point R to point $R_s$ (scaled point R) to be located on the line d2 and thus meet the maximum power imbalance $P_{imb,max}$ requirement. In the example illustrated by the point R located lower on the y axis, the stronger carrier power $P_H$ is kept constant, while the weaker carrier power $P_L$ is increased to move point R to point $R_s$ (scaled point R) to be located on the line d2 and thus meet the maximum power imbalance $P_{imb,max}$ requirement.

Figure 4A:
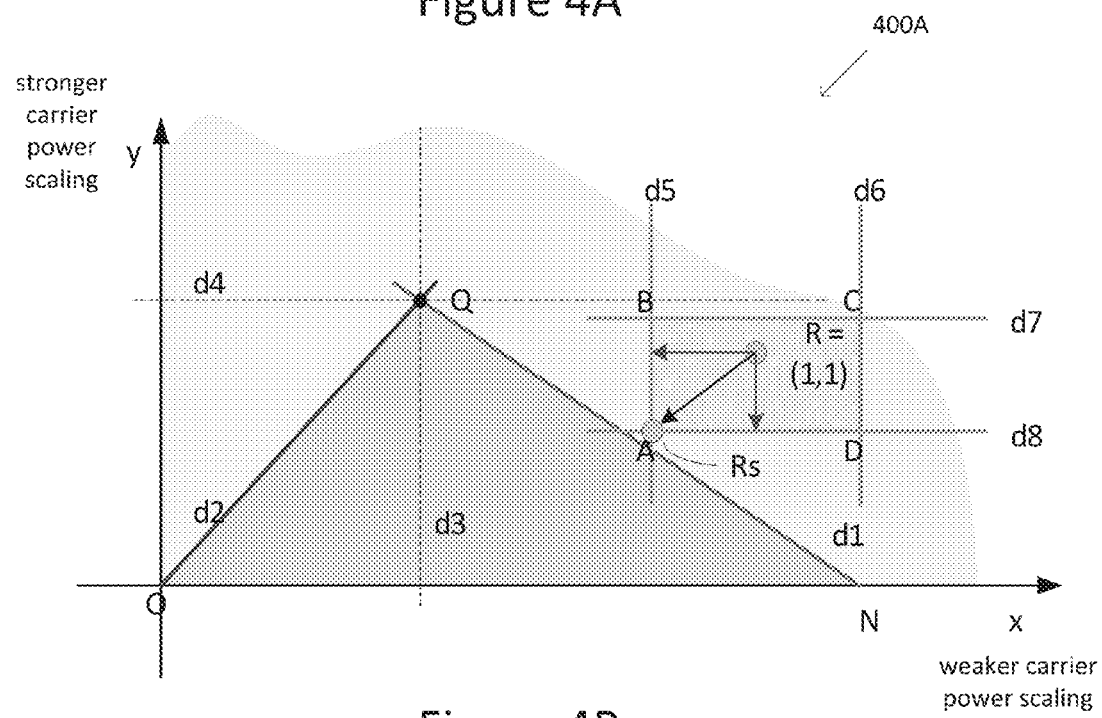
FIG. 4A illustrates a graph of the stronger carrier power scaling versus the weaker carrier power scaling to depict an example based on a maximum total power requirement.

FIG. 4A illustrates a graph of the stronger carrier power scaling (y axis) versus the weaker carrier power scaling (x axis) to depict one example in which the carrier powers are scaled to meet the maximum total power $P_{T,max}$ requirement (Equation 1a; line d1). Point A of the d5-d6-d7-d8 rectangle lies outside the d1-d2 triangle (i.e., no overlap between the rectangle and the triangle). In moving point R the search for the closest point on line d1 is unsuccessful indicating lack of a solution that completely satisfies the maximum total power $P_{T,max}$ requirement. In this particular case, the minimum carrier power scaling limits $x_{min}$ and $y_{min}$ do not allow an adjustment from point R to a position located on the line d1. However, the next best solution moves point R to a location as near as possible to line d1. The smallest possible modification to the carrier power levels is offered by point A. An additional scaling step may be used at a later stage to scale the overall signal in order to limit the total power to the maximum permissible total power $P_{T,max}$.

Figure 4B:
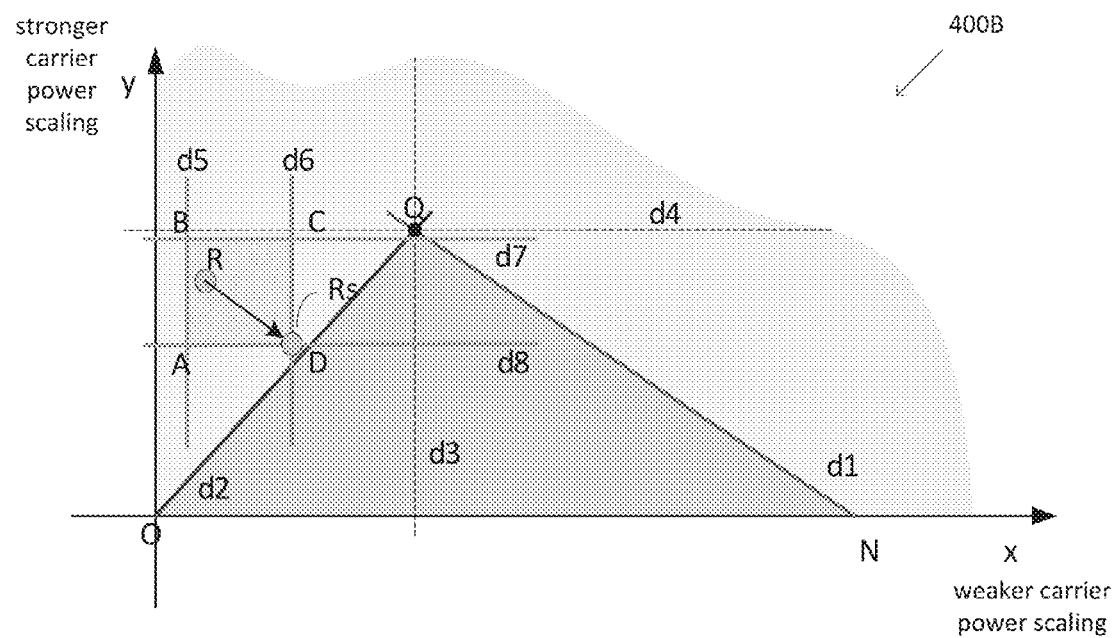
FIG. 4B illustrates a graph of the stronger carrier power scaling versus the weaker carrier power scaling to depict an example based on a maximum power imbalance requirement.

FIG. 4B illustrates a graph of the stronger carrier power scaling (y axis) versus the weaker carrier power scaling (x axis) to depict an example in which the carrier powers are scaled to meet the maximum power imbalance $P_{imb,max}$ requirement (Equation 2a; line d2). This example indicates a power imbalance problem since point R is located to the left of line d2 (power imbalance). The power imbalance cannot be fully removed as there is no path available from point R to a location on line d2 as the triangle and the rectangle do not overlap. The minimum carrier power scaling $y_{min}$ for the stronger carrier power $P_H$ represented by line d8 and the maximum carrier power scaling $x_{max}$ for the weaker carrier power $P_L$ represented by line d6 results in the selection of point D as the best possible solution. In this example the power of the stronger carrier power $P_H$ is reduced while that of the weak carrier power $P_L$ is increased to move point R to point $R_s$ and be as close as possible to meeting the maximum power imbalance $P_{imb,max}$ requirement.

Figure 5:
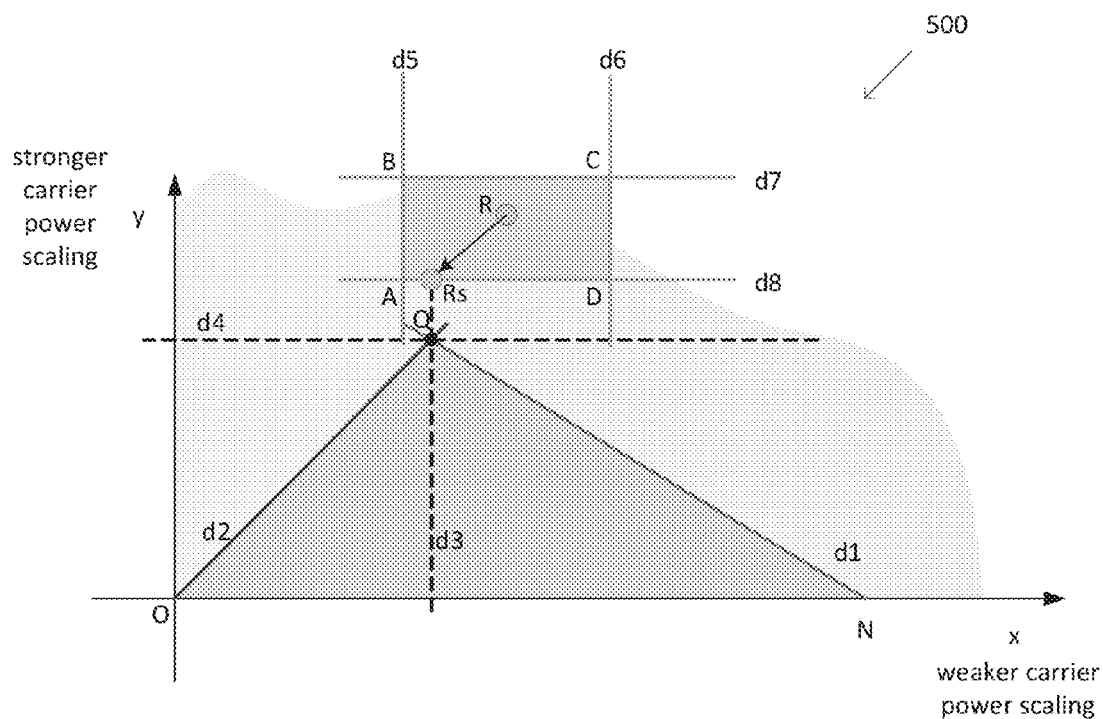
FIG. 5 illustrates a graph of the stronger carrier power scaling versus the weaker carrier power scaling to depict an example based on both a maximum total power requirement and a maximum power imbalance requirement.

FIG. 5 illustrates a graph of the stronger carrier power scaling (y axis) versus the weaker carrier power scaling (x axis) to depict an example in which the carrier powers are scaled to meet both the maximum total power $P_{T,max}$ requirement (Equation 1a; line d1) and the maximum power imbalance $P_{imb,max}$ requirement (Equation 2a; line d2). In the case of this example, line d8 (minimum carrier power scaling $y_{min}$ for the stronger carrier power $P_H$) lies above the intersection of lines d1 and d2 at point Q. There is no overlap between the d5-d6-d7-d8 rectangle and the d1-d2 triangle, so there is no location to move point R to be located on line d1 or line d2 of the d1-d2 triangle, and thus there is no solution that fully satisfies the requirements. In this particular case, minimum carrier power scaling $y_{min}$ at line d8 does not allow point R to be moved to a position on line d1 or line d2. However, the next best solution, which results in point R being located as near as possible to the d1-d2 triangle with the smallest possible modifications to the carrier power levels, is offered by the intersection of lines d3 and d8 at point Q. An additional scaling step may be used at a later stage to scale the overall signal in order to limit the total power to the maximum total power $P_{T,max}$ requirement.

Figure 6:
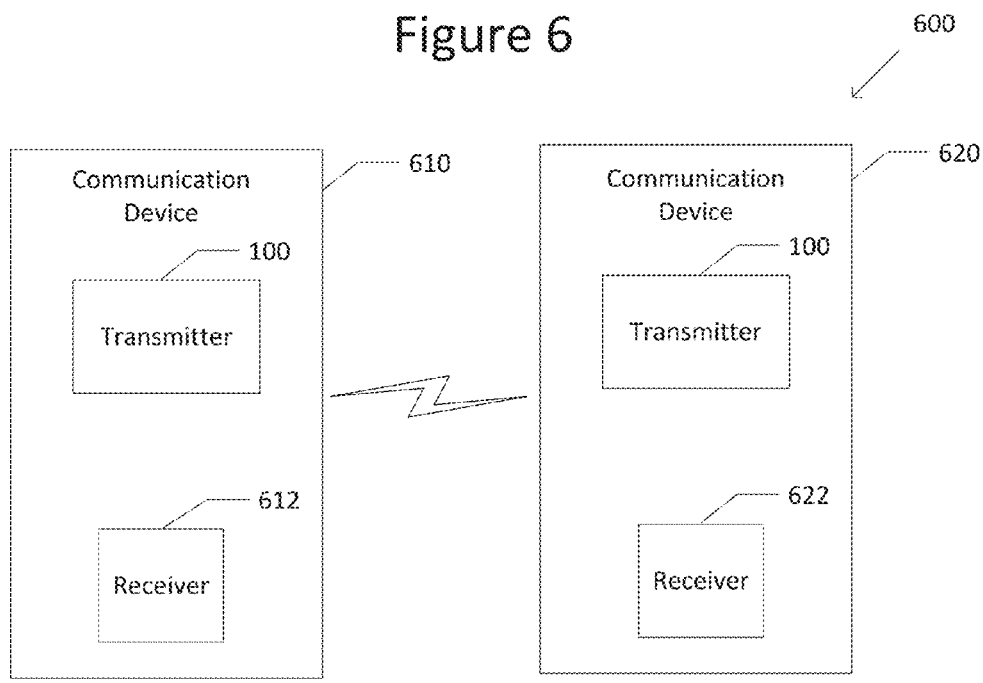
FIG. 6 illustrates a schematic diagram of a wireless communication system.

FIG. 6 illustrates a schematic diagram of a wireless communication system 600. The system 600 includes a first wireless communication device 610 and a second wireless communication device 620 that may be in wireless communication with each other. Each of the first wireless communication device 610 and the second wireless communication device 620 includes the transmitter 200 of FIG. 2 and a receiver 612, 622, respectively.

FIG. 7 illustrates a flowchart 700 of a method for transmitting a communication signal having at least a first carrier and a second carrier. The communication signal may be any multicarrier signal, such as a DC-HSUPA communication signal.

At Step 710, a scaling factor estimator 218 estimates a first power scaling factor x for the first carrier and a second power scaling factor y for the second carrier in a manner as described above. The first carrier in this example is the carrier with the lower carrier power $P_L$, and the second carrier is the carrier with the higher carrier power $P_H$.

At Step 720, a gain controller 214 adjusts at least one of a power of the first carrier based on the first power scaling factor x, and a power of the second carrier based on the second power scaling factor y. As described above, a sum of the adjusted powers of the first and second carriers is less than or equal to a maximum total power $P_{T,max}$ requirement, and a power imbalance between the adjusted powers of the first and second carriers is less than or equal to a maximum power imbalance $P_{imb,max}$ requirement.

At Step 730, a combiner 222 combines the first and second carriers having the adjusted powers.

At Step 740, an upconverter 224 upconverts the combined first and second carriers.

At Step 750, an amplifier 227 amplifies the upconverted, combined first and second carriers.

The disclosure also includes a computer program product embodied on a non-transitory computer-readable medium comprising program instructions configured such that when executed by processing circuitry causes the processing circuitry to implement the method of FIG. 7.

The transmitter 200, and corresponding method 700, disclosed herein is less complex than transmitters in which power imbalance is reduced by modifying the MAC layer. Instead power modifications are in the physical layer, with no requirement of modification by the MAC layer.

The transmitter 200 and method 700 are also more accurate. The described method is based on parameters that are updated just before uplink transmission, as described herein, resulting in a high degree of accuracy. In the case of DC-HSUPA for example, power scaling/balancing may be achieved by relying on estimated parameters and by selecting corresponding transmission data rates. However, as the estimated parameters are generated some time before the actual transmission, they may no longer be valid at the time of transmission resulting in inaccurate power scaling/balancing.

Also, the transmitter 200 and method 700 ensures operation within the permitted power limits (grants) set by the network. In addition, the scaling of power imbalance and total carrier power is accomplished simultaneously using the same algorithm, and thus processing time is shorter.

Example 1 is a transmitter for transmitting a communication signal having at least a first carrier and a second carrier, the transmitter comprising: a scaling factor estimator configured to estimate a first power scaling factor for the first carrier and a second power scaling factor for the second carrier; and a gain controller configured to adjust at least one of a power of the first carrier based on the first power scaling factor, and a power of the second carrier based on the second power scaling factor, wherein a sum of the adjusted powers of the first and second carriers is less than or equal to a maximum transmission power, and a power imbalance between the adjusted powers of the first and second carriers is less than or equal to a maximum power imbalance.

In Example 2, the subject matter of Example 1, wherein the scaling factor estimator and the gain controller are comprised in a physical layer.

In Example 3, the subject matter of Example 1, wherein the transmitter is a DC-HSUPA (Dual Carrier-High Speed Uplink Packet Access) transmitter.

In Example 4, the subject matter of Example 3, wherein the gain controller is further configured to adjust the powers of the first and second carriers periodically.

In Example 5, the subject matter of Example 3, wherein the gain controller is further configured to adjust the powers of the first and second carriers aperiodically.

In Example 6, the subject matter of Example 1, wherein the adjustment is performed at baseband.

In Example 7 the subject matter of Example 1, wherein the maximum power imbalance is determined by design, and the maximum transmission power is determined by a grant.

In Example 8, the subject matter of Example 1, wherein the scaling factor estimator is further configured to estimate the first power scaling factor for the first carrier and the second power scaling factor for the second carrier in accordance with the following equations: $y \leq x \cdot P_L/P_H + P_{T,max}$, and $y \leq x \cdot P_{imb,max} \cdot P_L/P_H$, where x is the first power scaling factor, y is the second power scaling factor, $P_L$ is the power of the first or second carrier having a lower power, and $P_H$ is the power of the first or second carrier having a higher power, $P_{T,max}$ is the maximum transmission power, and $P_{imb,max}$ is the maximum power imbalance.

In Example 9, the subject matter of Example 1, further comprising: a combiner configured to combine the first and second carriers having the adjusted powers.

In Example 10, the subject matter of Example 9, further comprising: an upconverter configured to upconvert the combined at least first and second carriers; and an amplifier configured to amplify the upconverted, combined first and second carriers.

In Example 11, a wireless communication device comprising the transmitter of Example 1.

Example 12 is a method for transmitting a communication signal having at least a first carrier and a second carrier, the method comprising: estimating, by a scaling factor estimator, a first power scaling factor for the first carrier and a second power scaling factor for the second carrier; and adjusting, by a gain controller, at least one of a power of the first carrier based on the first power scaling factor, and a power of the second carrier based on the second power scaling factor, wherein a sum of the adjusted powers of the first and second carriers is less than or equal to a maximum transmission power, and a power imbalance between the adjusted powers of the first and second carriers is less than or equal to a maximum power imbalance.

In Example 13, the subject matter of Example 12, wherein the estimating and adjusting are performed in a physical layer.

In Example 14, the subject matter of Example 12, wherein the communication signal is a DC-HSUPA (Dual Carrier-High Speed Uplink Packet Access) communication signal.

In Example 15, the subject matter of Example 14, wherein the estimating and adjusting is performed periodically.

In Example 16, the subject matter of Example 14, wherein the estimating and adjusting is performed aperiodically.

In Example 17, the subject matter of Example 12, wherein the adjusting is performed at baseband.

In Example 18, the subject matter of Example 12, wherein the maximum power imbalance is determined at time of manufacture of a transmitter performing the method of transmitting, and the maximum transmission power is determined by a grant.

In Example 19, the subject matter of Example 12, wherein the first power scaling factor for the first carrier and the second power scaling factor for the second carrier are estimated in accordance with the following equations: $y \leq x \cdot P_L/P_H + P_{T,max}$, and $y \leq x \cdot P_{imb,max} \cdot P_L/P_H$, where x is the first power scaling factor, y is the second power scaling factor, $P_L$ is the power of the first or second carrier having a lower power, and $P_H$ is the power of the first or second carrier having a higher power, $P_{T,max}$ is the maximum transmission power, and $P_{imb,max}$ is the maximum power imbalance.

In Example 20, the subject matter of Example 12, further comprising: combining, by a combiner, the first and second carriers having the adjusted powers.

In Example 21, the subject matter of Example 20, further comprising: upconverting, by an upconverter, the combined first and second carriers; and amplifying, by an amplifier, the upconverted, combined first and second carriers.

Example 22 is a computer program product embodied on a non-transitory computer-readable medium comprising program instructions configured such that when executed by processing circuitry causes the processing circuitry to implement the method of Example 12.

Example 23 is a transmitter for transmitting a communication signal having at least a first carrier and a second carrier, the transmitter comprising: a scaling factor estimating means for estimating a first power scaling factor for the first carrier and a second power scaling factor for the second carrier; and a gain controlling means for adjusting at least one of a power of the first carrier based on the first power scaling factor, and a power of the second carrier based on the second power scaling factor, wherein a sum of the adjusted powers of the first and second carriers is less than or equal to a maximum transmission power, and a power imbalance between the adjusted powers of the first and second carriers is less than or equal to a maximum power imbalance.

In Example 24, the subject matter of Example 23, further comprising: a combining means for combining the first and second carriers having the adjusted powers.

In Example 25, the subject matter of Example 24, further comprising: an upconverting means for upconverting the combined first and second carriers; and an amplifying means for amplifying the upconverted, combined first and second carriers.

In Example 26, the subject matter of any of Examples 1-6, wherein the maximum power imbalance is determined by design, and the maximum transmission power is determined by a grant.

In Example 27, the subject matter of any of Examples 1-6, wherein the scaling factor estimator is further configured to estimate the first power scaling factor for the first carrier and the second power scaling factor for the second carrier in accordance with the following equations: $y \leq x \cdot P_L/P_H + P_{T,max}$, and $y \leq x \cdot P_{imb,max} \cdot P_L/P_H$, where x is the first power scaling factor, y is the second power scaling factor, $P_L$ is the power of the first or second carrier having a lower power, and $P_H$ is the power of the first or second carrier having a higher power, $P_{T,max}$ is the maximum transmission power, and $P_{imb,max}$ is the maximum power imbalance.

In Example 28, the subject matter of any of Examples 1-6, further comprising: a combiner configured to combine the first and second carriers having the adjusted powers.

In Example 29, the subject matter of any of Examples 12-17, wherein the maximum power imbalance is determined at time of manufacture of a transmitter performing the method of transmitting, and the maximum transmission power is determined by a grant.

In Example 30, the subject matter of any of Examples 12-17, wherein the first power scaling factor for the first carrier and the second power scaling factor for the second carrier are estimated in accordance with the following equations: $y \leq x \cdot P_L/P_H + P_{T,max}$, and $y \leq x \cdot P_{imb,max} \cdot P_L/P_H$, where x is the first power scaling factor, y is the second power scaling factor, $P_L$ is the power of the first or second carrier having a lower power, and $P_H$ is the power of the first or second carrier having a higher power, $P_{T,max}$ is the maximum transmission power, and $P_{imb,max}$ is the maximum power imbalance.

In Example 31, the subject matter of any of Examples 12-17, further comprising: combining, by a combiner, the first and second carriers having the adjusted powers.

In Example 32, the subject matter of any of Examples 23-24, further comprising: an upconverting means for upconverting the combined first and second carriers; and an amplifying means for amplifying the upconverted, combined first and second carriers.

Example 33 is an apparatus substantially as shown and described.

Example 34 is a method substantially as shown and described.

While the foregoing has been described in conjunction with exemplary aspect, it is understood that the term "exemplary" is merely meant as an example, rather than the best or optimal. Accordingly, the disclosure is intended to cover alternatives, modifications and equivalents, which may be included within the scope of the disclosure.

Although specific aspects have been illustrated and described herein, it will be appreciated by those of ordinary skill in the art that a variety of alternate and/or equivalent implementations may be substituted for the specific aspects shown and described without departing from the scope of the present application. This application is intended to cover any adaptations or variations of the specific aspects discussed herein.

The invention claimed is:

1. A transmitter for transmitting a communication signal having at least a first carrier and a second carrier, the transmitter comprising:
   a scaling factor estimator configured to estimate a first power scaling factor for the first carrier and a second power scaling factor for the second carrier, and
   a gain controller configured to adjust at least one of a power of the first carrier based on the first power scaling factor, and a power of the second carrier based on the second power scaling factor,
   wherein a sum of the adjusted powers of the first and second carriers is less than or equal to a maximum transmission power, and a power imbalance between the adjusted powers of the first and second carriers is less than or equal to a maximum power imbalance, and
   wherein the estimations of the first and second power scaling factors and the adjustments of the powers of the first and second carriers are performed within a physical layer only.

2. The transmitter of claim 1, wherein the scaling factor estimator and the gain controller are comprised in the physical layer.

3. The transmitter of claim 1, wherein the transmitter is a DC-HSUPA (Dual Carrier-High Speed Uplink Packet Access) transmitter.

4. The transmitter of claim 3, wherein the gain controller is further configured to adjust the powers of the first and second carriers periodically.

5. The transmitter of claim 3, wherein the gain controller is further configured to adjust the powers of the first and second carriers aperiodically.

6. The transmitter of claim 1, wherein the adjustment is performed at baseband.

7. The transmitter of claim 1, wherein the maximum power imbalance is determined by design, and the maximum transmission power is determined by a grant.

8. The transmitter of claim 1, wherein the scaling factor estimator is further configured to estimate the first power scaling factor for the first carrier and the second power scaling factor for the second carrier in accordance with the following equations:

$$y \le x \cdot P_L/P_H + P_{T,max}, \text{ and}$$

$$y \le x \cdot P_{imb,max} \cdot P_L/P_H,$$

where x is the first power scaling factor, y is the second power scaling factor, $P_L$ is the power of the first or second carrier having a lower power, and $P_H$ is the power of the first or second carrier having a higher power, $P_{T,max}$ is the maximum transmission power, and $P_{imb,max}$ is the maximum power imbalance.

9. The transmitter of claim 1, further comprising:
   a combiner configured to combine the first and second carriers having the adjusted powers.

10. The transmitter of claim 9, further comprising:
    an upconverter configured to upconvert the combined at least first and second carriers; and
    an amplifier configured to amplify the upconverted, combined first and second carriers.

11. A wireless communication device comprising the transmitter of claim 1.

12. A method for transmitting a communication signal having at least a first carrier and a second carrier, the method comprising:
    estimating, by a scaling factor estimator, a first power scaling factor for the first carrier and a second power scaling factor for the second carrier; and
    adjusting, by a gain controller, at least one of a power of the first carrier based on the first power scaling factor, and a power of the second carrier based on the second power scaling factor,
    wherein a sum of the adjusted powers of the first and second carriers is less than or equal to a maximum transmission power, and a power imbalance between the adjusted powers of the first and second carriers is less than or equal to a maximum power imbalance, and
    wherein the estimating the first and second power sealing factors and the adjusting the powers of the first and second carriers are performed within a physical layer only.

13. The method of claim 12, wherein the estimating and adjusting are performed in the physical layer.

14. The method of claim 12, wherein the communication signal is a DC-HSUPA (Dual Carrier-High Speed Uplink Packet Access) communication signal.

15. The method of claim 14, wherein the estimating and adjusting is performed periodically.

16. The method of claim 14, wherein the estimating and adjusting is performed aperiodically.

17. The method of claim 12, wherein the adjusting is performed at baseband.

18. The method of claim 12, wherein the maximum power imbalance is determined at time of manufacture of a transmitter performing the method of transmitting, and the maximum transmission power is determined by a grant.

19. The method of claim 12, wherein the first power scaling factor for the first carrier and the second power scaling factor for the second carrier are estimated in accordance with the following equations:

$$y \le x \cdot P_L/P_H + P_{T,max}, \text{ and}$$

$$y \le x \cdot P_{imb,max} \cdot P_L/P_H,$$

where x is the first power scaling factor, y is the second power scaling factor, $P_L$ is the power of the first or second carrier having a lower power, and $P_H$ is the power of the first or second carrier having a higher power, $P_{T,max}$ is the maximum transmission power, and $P_{imb,max}$ is the maximum power imbalance.

20. The method of claim 12, further comprising:
combining, by a combiner, the first and second carriers having the adjusted powers.

21. The method of claim 20, further comprising:
upconverting, by an upconverter, the combined first and second carriers; and
amplifying, by an amplifier, the upconverted, combined first and second carriers.

22. A computer program product embodied on a non-transitory computer-readable medium comprising program instructions configured such that when executed by processing circuitry causes the processing circuitry to implement the method of claim 12.

23. A transmitter for transmitting a communication signal having at least a first carrier and a second carrier, the transmitter comprising:
a scaling factor estimating means for estimating a first power scaling factor for the first carrier and a second power scaling factor for the second carrier, and
a gain controlling means for adjusting at least one of a power of the first carrier based on the first power scaling factor, and a power of the second carrier based on the second power scaling factor,
wherein a sum of the adjusted powers of the first and second carriers is less than or equal to a maximum transmission power, and a power imbalance between the adjusted powers of the first and second carriers is less than or equal to a maximum power imbalance, and
wherein the estimating the first and second power scaling factors and the adjusting the powers of the first and second carriers are performed within a physical layer only.

24. The transmitter of claim 23, further comprising:
a combining means for combining the first and second carriers having the adjusted powers.

25. The transmitter of claim 24, further comprising:
an upconverting means for upconverting the combined first and second carriers; and
an amplifying means for amplifying the upconverted, combined first and second carriers.

* * * * *